US008321080B2

(12) United States Patent
Bamba

(10) Patent No.: US 8,321,080 B2
(45) Date of Patent: Nov. 27, 2012

(54) ENGINE TEMPERATURE DISPLAY DEVICE FOR A WATERCRAFT PROPULSION UNIT AND A WATERCRAFT

(75) Inventor: Takaaki Bamba, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 522 days.

(21) Appl. No.: 12/108,671

(22) Filed: Apr. 24, 2008

(65) Prior Publication Data

US 2008/0270002 A1 Oct. 30, 2008

(30) Foreign Application Priority Data

Apr. 26, 2007 (JP) ................................ 2007-116558

(51) Int. Cl.
*G06F 7/00* (2006.01)
*G06F 13/00* (2006.01)
*G01M 17/00* (2006.01)
*G08B 23/00* (2006.01)
*B60Q 1/00* (2006.01)

(52) U.S. Cl. ........ 701/21; 701/102; 701/30.9; 701/31.1; 340/870.04; 340/870.17; 340/984; 340/449

(58) Field of Classification Search ................ 701/1, 21, 701/29, 30, 33, 35, 36, 99, 101, 102, 29.1, 701/29.6, 30.9, 31.1, 31.5, 32.7, 33.7, 33.8, 701/33.9, 34.2; 340/870.01, 870.02, 870.04, 340/870.05, 870.07, 870.16, 870.17, 984, 340/438, 439, 449

See application file for complete search history.

(56) References Cited

U.S. PATENT DOCUMENTS

| | | | | |
|---|---|---|---|---|
| 5,848,381 | A * | 12/1998 | Ishii et al. | 702/99 |
| 5,921,220 | A | 7/1999 | Kato | |
| 6,910,927 | B2 | 6/2005 | Kanno | |
| 7,330,133 | B2 | 2/2008 | Kawanishi et al. | |
| 2005/0288833 | A1* | 12/2005 | Motose | 701/21 |
| 2006/0020376 | A1* | 1/2006 | Kanno et al. | 701/21 |
| 2006/0293807 | A1* | 12/2006 | Okuyama | 701/21 |
| 2009/0187297 | A1* | 7/2009 | Kish et al. | 701/21 |

FOREIGN PATENT DOCUMENTS

| | | | |
|---|---|---|---|
| JP | 06-122395 | A | 5/1994 |
| JP | 08-326538 | A | 12/1996 |
| JP | 11-223152 | A | 8/1999 |
| JP | 2004-257351 | A | 9/2004 |

* cited by examiner

*Primary Examiner* — Thomas Tarcza
*Assistant Examiner* — Edward Pipala
(74) *Attorney, Agent, or Firm* — Keating & Bennett, LLP

(57) ABSTRACT

In engine temperature display device for a watercraft, an engine temperature data value is calculated based on a detection signal of a temperature of an engine of an outboard motor. The engine temperature data value is sent to an engine state display device installed in a watercraft by a LAN. A control portion of the engine state display device computes the engine temperature data value based on a plurality of threshold temperatures of a standard engine model stored in a nonvolatile memory, and converts the data value into a display data for indicating a temperature level among a plurality of temperature levels. The display data is displayed on a display device on the watercraft. An engine temperature data value calculating and sending device computes using a plurality of threshold values on an engine block wall temperature specific to an engine, and sends the appropriately converted engine temperature data value. The engine state display device for the watercraft propulsion unit can display an appropriate temperature level of the engine coolant temperature indicated for a model with higher engine coolant temperatures.

5 Claims, 7 Drawing Sheets

ENGINE TEMPERATURE DISPLAY DEVICE FOR A WATERCRAFT PROPULSION UNIT AND A WATERCRAFT

BACKGROUND OF THE INVENTION

1. Field of the Invention

The present invention relates to an engine temperature display device for a watercraft propulsion unit and a watercraft including an engine state display device for displaying an engine temperature, which is one of the display factors of an engine state, on a display device on a watercraft.

2. Description of the Related Art

One of the display factors of an engine state of an outboard motor is the engine temperature (i.e., an engine coolant temperature). Conventionally, a signal from a sensor for detecting an engine coolant temperature is input to an engine control unit. Data about the engine coolant temperature is sent from the engine control unit to a display device on a watercraft by a LAN (Local Area Network), and displayed thereon.

JP-A-2005-164743 discloses an engine state display device for a watercraft propulsion unit including an engine state display device in which a state data value obtained by detecting each state of an engine of an outboard motor is sent by the LAN, wherein the state data value is input to a Central processing Unit (CPU) via a transmission module, the state data value is computed based on display information stored in a nonvolatile memory in the CPU and converted into display data among a plurality of temperature levels, and the display data is displayed on a display device via a display driver.

In the engine state display device for the watercraft propulsion unit, a plurality of threshold temperatures on the engine coolant temperature is previously stored as the display information in the nonvolatile memory. When a detection signal of a temperature sensor for detecting the engine coolant temperature, which is sent by the LAN, is input, the CPU calculates an engine coolant temperature, compares the engine coolant temperature with a plurality of threshold temperatures, and thereby converts the engine coolant temperature into the display data for displaying the engine coolant temperature in five levels.

However, in the engine state display device for the watercraft propulsion unit in JP-A-2005-164743, the plurality of threshold temperatures on engine coolant temperature stored in the nonvolatile memory is commonly used among many outboard motor models. On the other hand, since the engine coolant temperature level sent from the engine control unit of the outboard motor may be different model, there is a case that a state data value is computed based on the display information (e.g., the plurality of threshold temperatures on the engine coolant temperature) of a different model and the display data is output. In such a case, an engine coolant temperature displayed on the display device is not an advisable temperature level. For example, if the display information for a model with high engine coolant temperatures is used in a model with low engine coolant temperatures, the display device of the engine state display device for the watercraft propulsion unit may display a high temperature level based on the model with high engine coolant temperatures, and as a result a user may be concerned that the engine coolant temperature is too high for the model with low engine coolant temperatures.

Therefore, in models in which engine coolant temperatures are different, for example, a model with high engine coolant temperatures requires a new temperature sensor in an appropriate position such that an engine coolant temperature can be appropriately detected, and thereby a system for displaying the appropriate temperature levels is provided.

However, such a system requires more parts and assembly steps, and also costs more.

SUMMARY OF THE INVENTION

In order to overcome the problems described above, preferred embodiments of the present invention provide a watercraft and an engine temperature display device for a watercraft propulsion unit in which an engine temperature is displayed at an appropriate level on an engine stated is play device, which has already been installed in the watercraft, even if a user purchases a new outboard motor which has a different engine coolant temperature setting.

A first preferred embodiment of the present invention is an engine temperature display device for a watercraft propulsion unit, preferably including an engine temperature data value calculating and sending device arranged to detect a temperature of an engine of the watercraft propulsion unit, calculate an engine temperature data value based on the detection signal, and send the engine temperature data value by a LAN; and an engine state display device arranged to compute the engine temperature data value based on a standard threshold temperature in a control portion, convert the engine temperature data value into a display data for indicating a temperature level among a plurality of temperature levels, and display the display data on a display device on the watercraft, wherein the engine temperature data value calculating and sending device computes the detection signal using a plurality of threshold values on an engine block wall temperature of the engine, and sends the detection signal as an engine temperature data value converted into an appropriate temperature level when the data value is computed in the engine state display device.

A second preferred embodiment of the present invention is an engine temperature display device for a watercraft propulsion unit according to the first preferred embodiment which detects the engine block wall temperature of the watercraft propulsion unit, and calculates the engine temperature data value based on this detection signal.

A third preferred embodiment of the present invention is an engine temperature display device for a watercraft propulsion unit according to the first or second preferred embodiment, in which the control portion of an engine control unit calculates the engine temperature data value.

A fourth preferred embodiment of the present invention is a watercraft including the engine temperature display device according to any one of the first through third preferred embodiments.

With the engine temperature display device according to the preferred embodiments above, an engine temperature at an appropriate level is displayed on an engine state display device which has been already installed in a watercraft, even if a user purchases a new outboard motor which has a different engine coolant temperature setting.

With the engine temperature display device according to the second preferred embodiment, an engine temperature is calculated from an engine block wall temperature of the watercraft propulsion unit. Therefore, a more appropriate temperature detection can be achieved, and an engine coolant temperature at an appropriate level can be displayed. A detection sensor for detecting an engine temperature, which is already required for controlling an engine, can be used, and thereby an additional temperature sensor for displaying an engine coolant temperature does not have to be provided.

With the engine temperature display device according to the third preferred embodiment, by not having a control portion for calculating an engine temperature data value on the watercraft propulsion unit separately from the engine control unit, the control portion of the engine control unit can correspond to the engine state display device which has been already installed by merely correcting software programs thereof.

The engine temperature display device according to the fourth preferred embodiment has the same benefits and advantages as the engine temperature display device according to any one of first through third preferred embodiments.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention will be described hereinafter.

First Preferred Embodiment

FIGS. 1 through 7 show a first preferred embodiment of the present invention.

Figure 1:
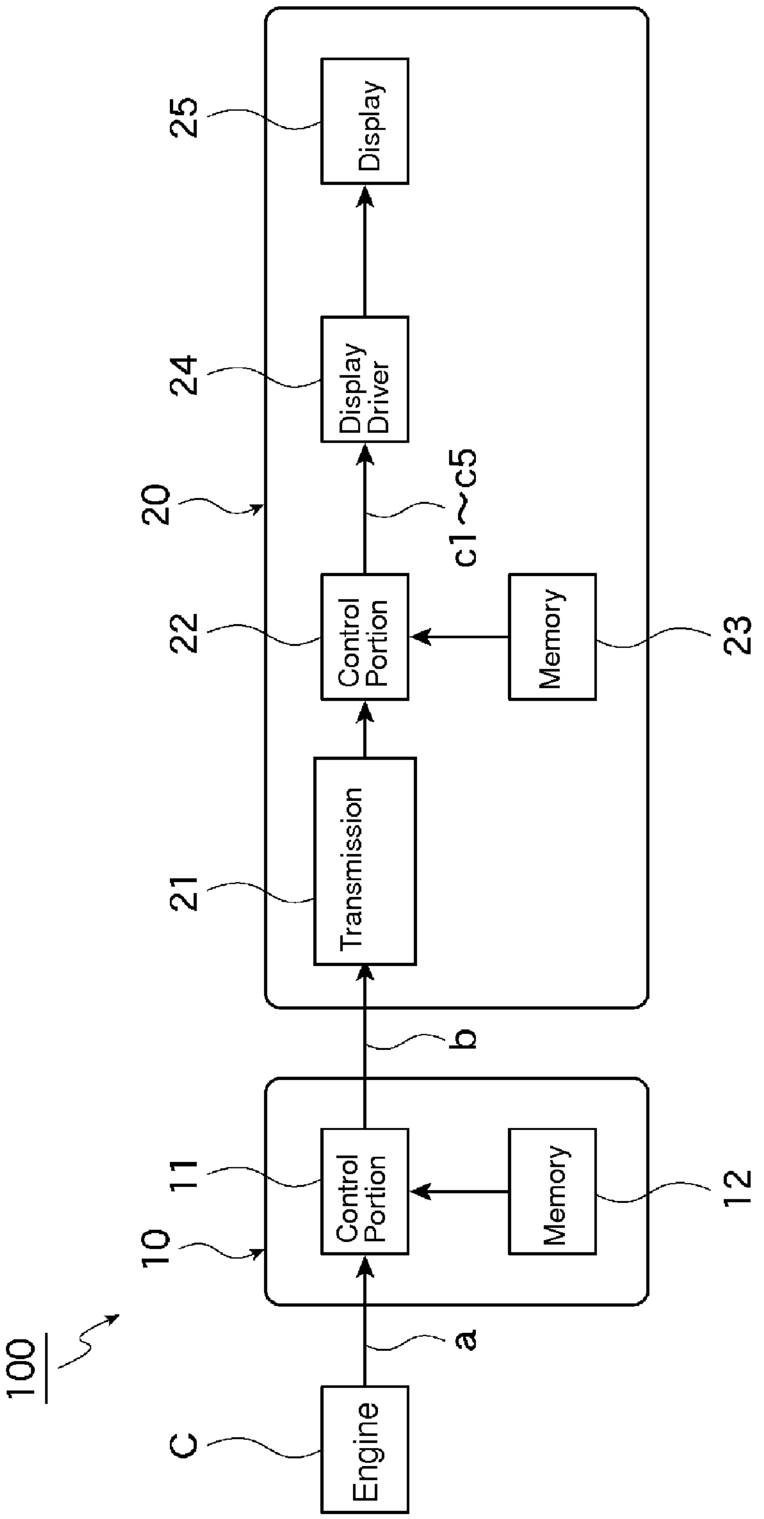
FIG. 1 is a block diagram of an engine state display system for a watercraft propulsion unit including an engine temperature display device according to a preferred embodiment of the present invention.
Figure 2:
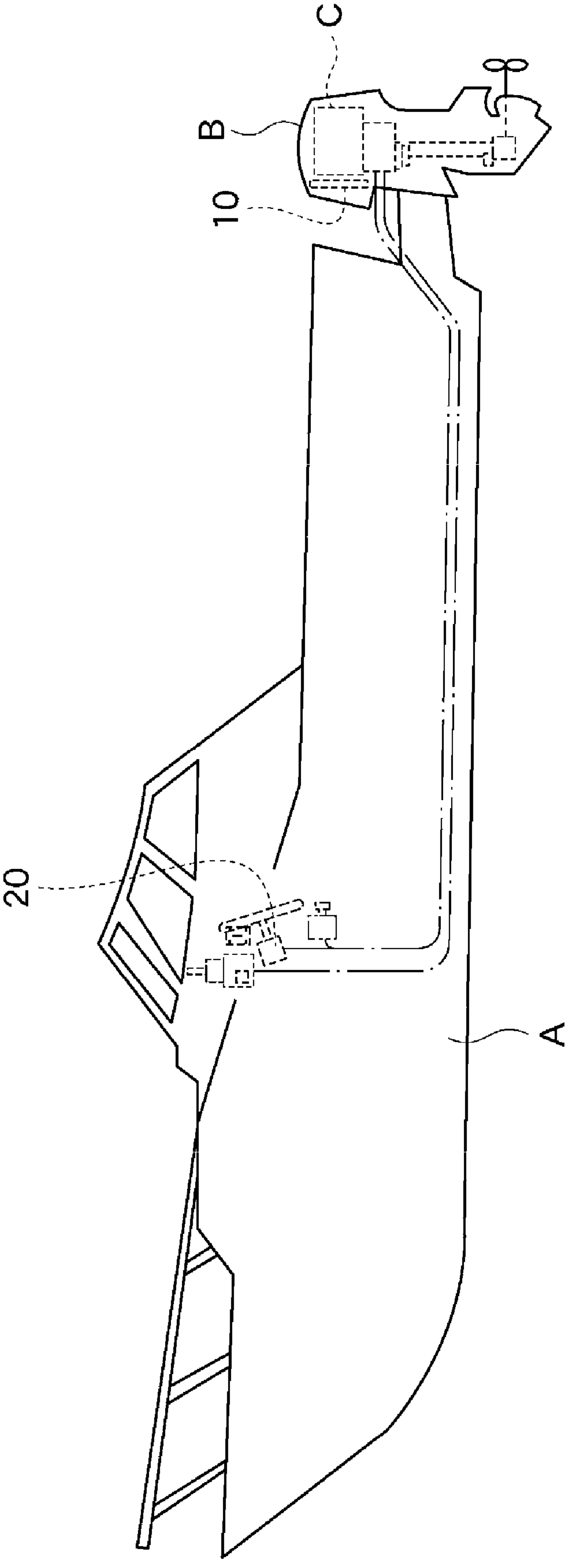
FIG. 2 is a schematic side view of a watercraft including the engine temperature display device for the watercraft propulsion unit in FIG. 1.

First, an overall construction will be described. FIG. 1 shows an engine state display system 100 for a watercraft propulsion unit (simply referred to as the display system hereinafter) including an engine temperature display device for the watercraft propulsion unit. As shown in FIG. 2, the display system includes an engine control unit (referred to as the ECU hereinafter) 10 installed in an outboard motor B provided on a stern of a watercraft A, an engine state display device 20 for the watercraft propulsion unit (simply referred to as the gauge hereinafter) installed in a position in front of a steering seat of the watercraft A, and a plurality of detection devices (not shown) arranged to detect each state of an engine C of the outboard motor B. The display system sends a state data value from the ECU 10 to the gauge 20 by a LAN, computes the state data value using display information (a plurality of thresholds) at the gauge 20, converts a computed data value into display data, and displays each state of the engine for the watercraft propulsion unit on a display portion.

Figure 3:
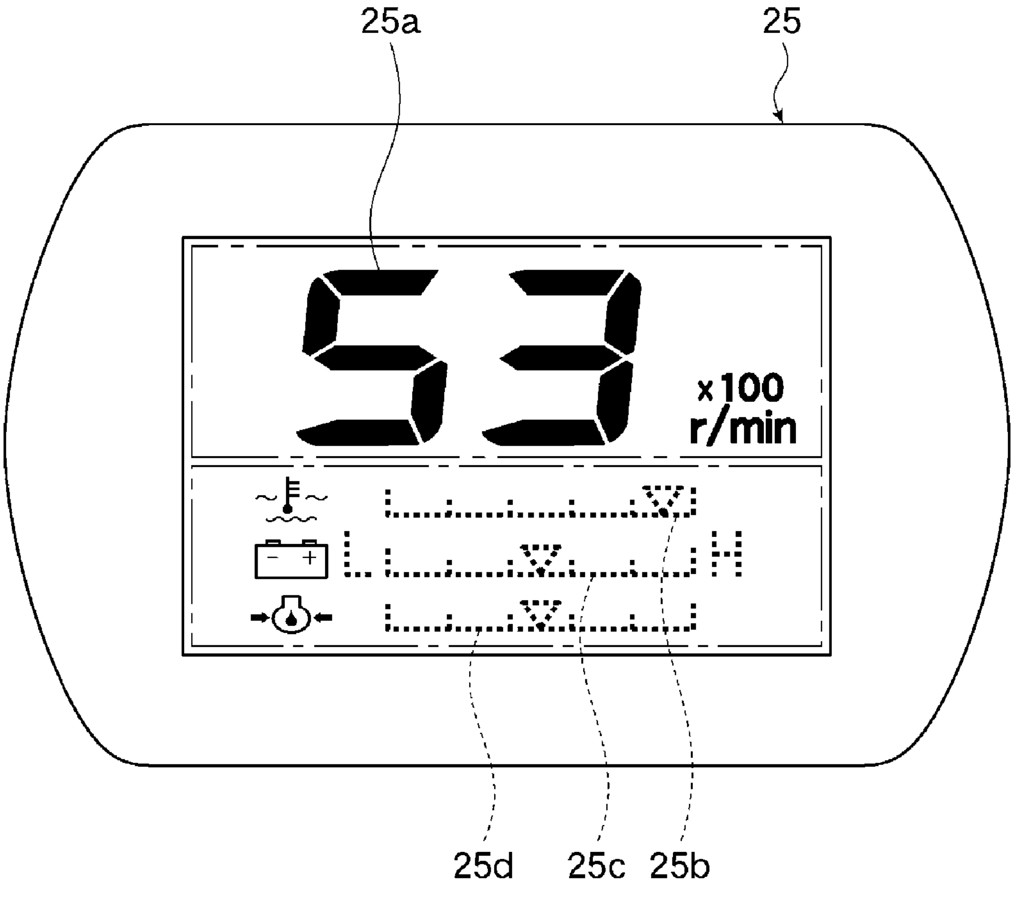
FIG. 3 is a detailed front view of a display portion of the engine state display system for the watercraft propulsion unit in FIG. 3.

The ECU 10 inputs a detection signal "a" that includes, for example, an engine speed of the engine C, an engine temperature, a voltage of a battery, and an oil pressure detected by detection devices (not shown), computes the signals and converts the signals into a state data value (e.g., engine temperature data value) "b", and sends the state data value "b" to the gauge 20 by the LAN (see FIG. 1). As shown in FIG. 3, the gauge 20 displays, for example, an engine speed 25*a* numerically in a display portion 25 in the form of a liquid crystal panel or the like. In a lower portion thereof, the state of each of an engine temperature (i.e., engine coolant temperature) 25*b*, a voltage level 25*c* of the battery, and an oil pressure level 25*d* is displayed in a manner such that each state is indicated in five levels by the position of a cursor (pointer) on a five-pitch memory. The display of the engine temperature will be described hereinafter. Descriptions about engine speed, battery voltage, and oil pressure states will be omitted.

Figure 6:
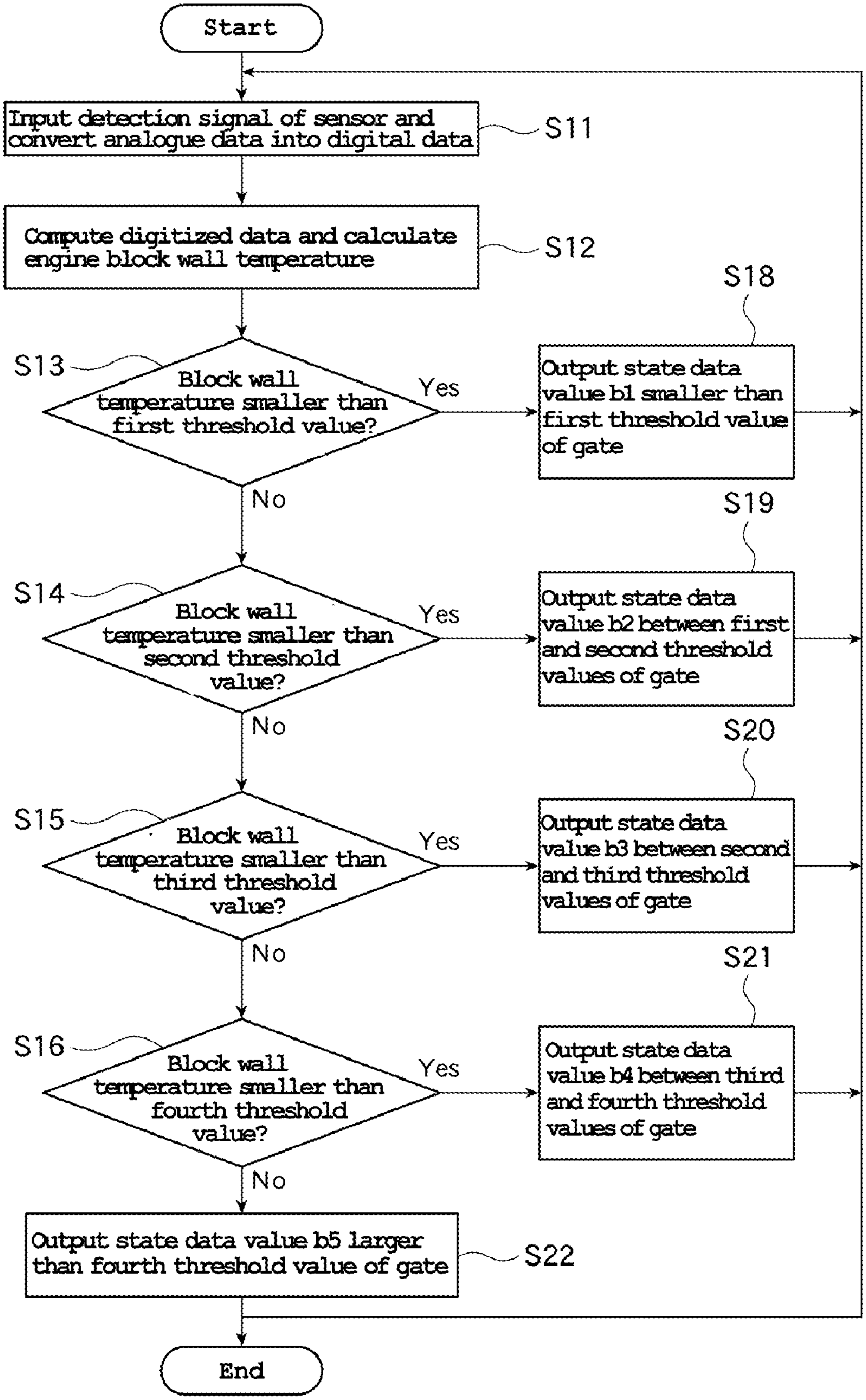
FIG. 6 is a flowchart showing a control process executed by an ECU of the engine state display system for the watercraft propulsion unit in FIG. 1.

The ECU 10 performs an engine control by a control portion 11, and operates a control process shown in the flowchart in FIG. 6. The control portion 11 inputs a detection signal from a temperature sensor (not shown) for detecting an engine block wall temperature from a LAN port, and converts the analog signal into a digital signal (step S11). The control portion 11 computes an engine block wall temperature (step S12). The control portion 11 makes a determination about the temperature by reading out each of the first through fourth threshold values stored in a nonvolatile memory 12 one after another (steps S13 through S16). Thereafter, the control portion 11 provides state data values (communication data) b1 through b5 converted in a manner such that they are appropriately processed by the gauge 20, and sends them from a transmission module (not shown) to the gauge 20 (steps S18 through S22). This flow is repeated in the control portion 11.

The gauge 20 includes a transmission module 21, a control portion 22, a nonvolatile memory 23, a display driver 24, and the display portion 25.

The transmission module 21 of the gauge 20 receives the state data values b1 through b5 sent from the ECU 10 by the LAN, converts them into state data values b1 through b5, which are digital data, and inputs them to the control portion 22. The control portion 22 operates in the control process shown in the flowchart in FIG. 7, and makes determinations about the stated at a values b1 through b5 by reading out each of the first through fourth threshold values stored in the nonvolatile memory 23 (steps S33 through S36). Thereafter, the control portion 22 provides display data c1 through c5 of the first through fifth levels converted in a manner such that they are appropriately processed by the gauge 20 (steps S37 through S41). The gauge 20 displays the display data on the display portion 25 via the display driver 24. This flow is repeated in the gauge 20.

Next, descriptions will be made about the relationship between the first through fourth threshold values stored in the nonvolatile memory 12 and the first through fourth threshold values stored in the nonvolatile memory 23 with reference to the graphs shown in FIGS. 4 and 5.

Figure 4:
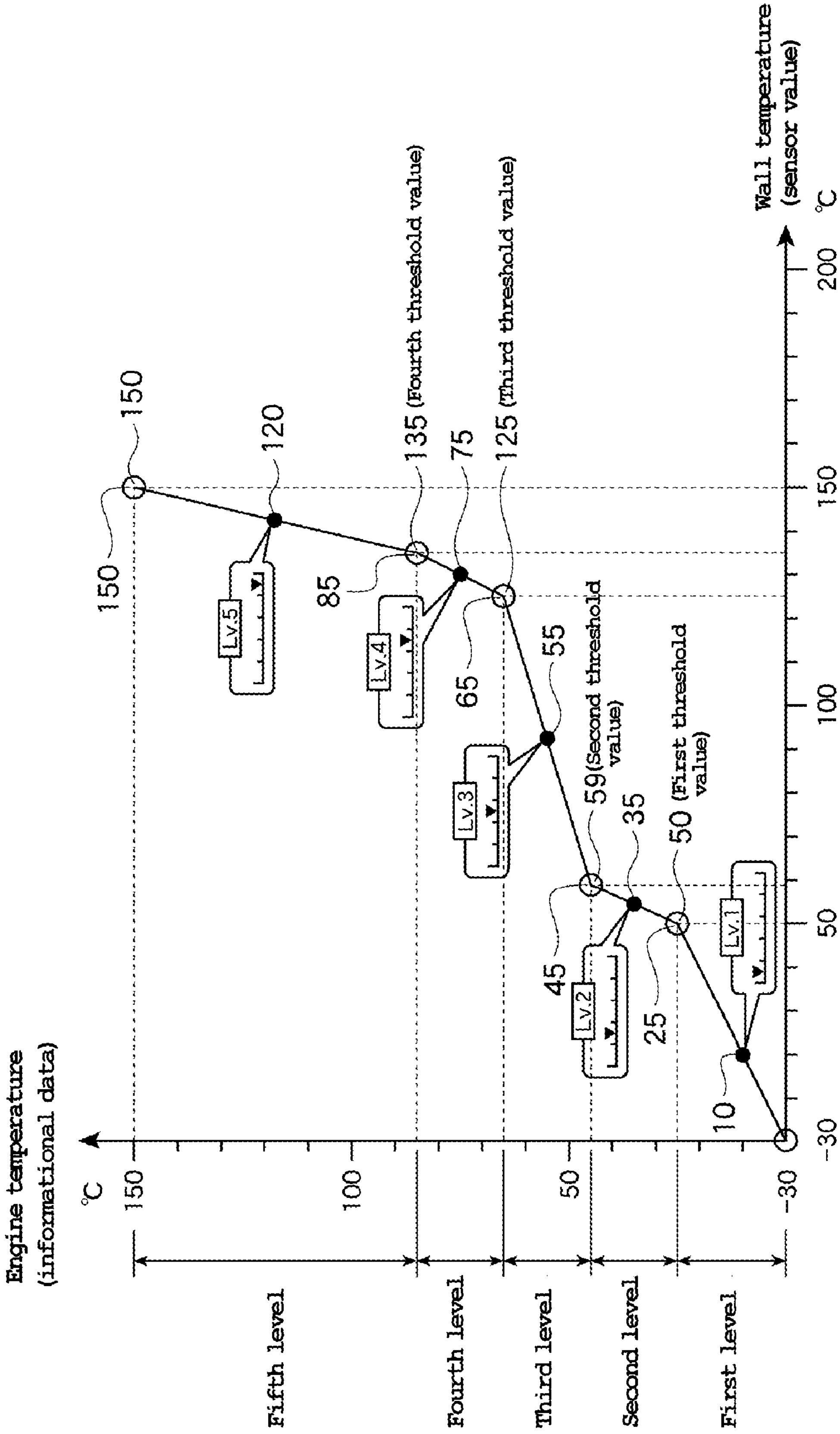
FIG. 4 is a graph indicating the relationship between engine block wall temperature and engine coolant temperature of a standard engine model.

The graph shown in FIG. 4 indicates the relationship between engine block wall temperature and engine temperature in a standard engine model. As indicated in the graph, the engine block wall temperatures, −30° C., 50° C., 59° C., 125° C., 135° C., and 150° C., are the temperatures at inflection points. The engine temperatures, −30° C., 25° C., 45° C., 65° C., 85° C., and 150° C., respectively, correspond to the engine block wall temperatures. The engine block wall temperature, 59° C., for example, is the minimum temperature of the engine in a normal state. The engine block wall temperature, 125° C., for example, is the maximum temperature of the engine in the normal state.

FIG. 4 shows how the display portion 25 in FIG. 3 displays the engine temperatures in five levels corresponding to respective line sections for understanding of the descriptions. As illustrated in the graph, in the display portion 25 of the present preferred embodiment, a line section corresponds to one pitch of the five-pitch memory on the temperature display on the gauge 20. The cursor (pointer) points to the middle portion of a range between a pitch and the next pitch corresponding to any line section representing a temperature range of the sensor.

Figure 5:
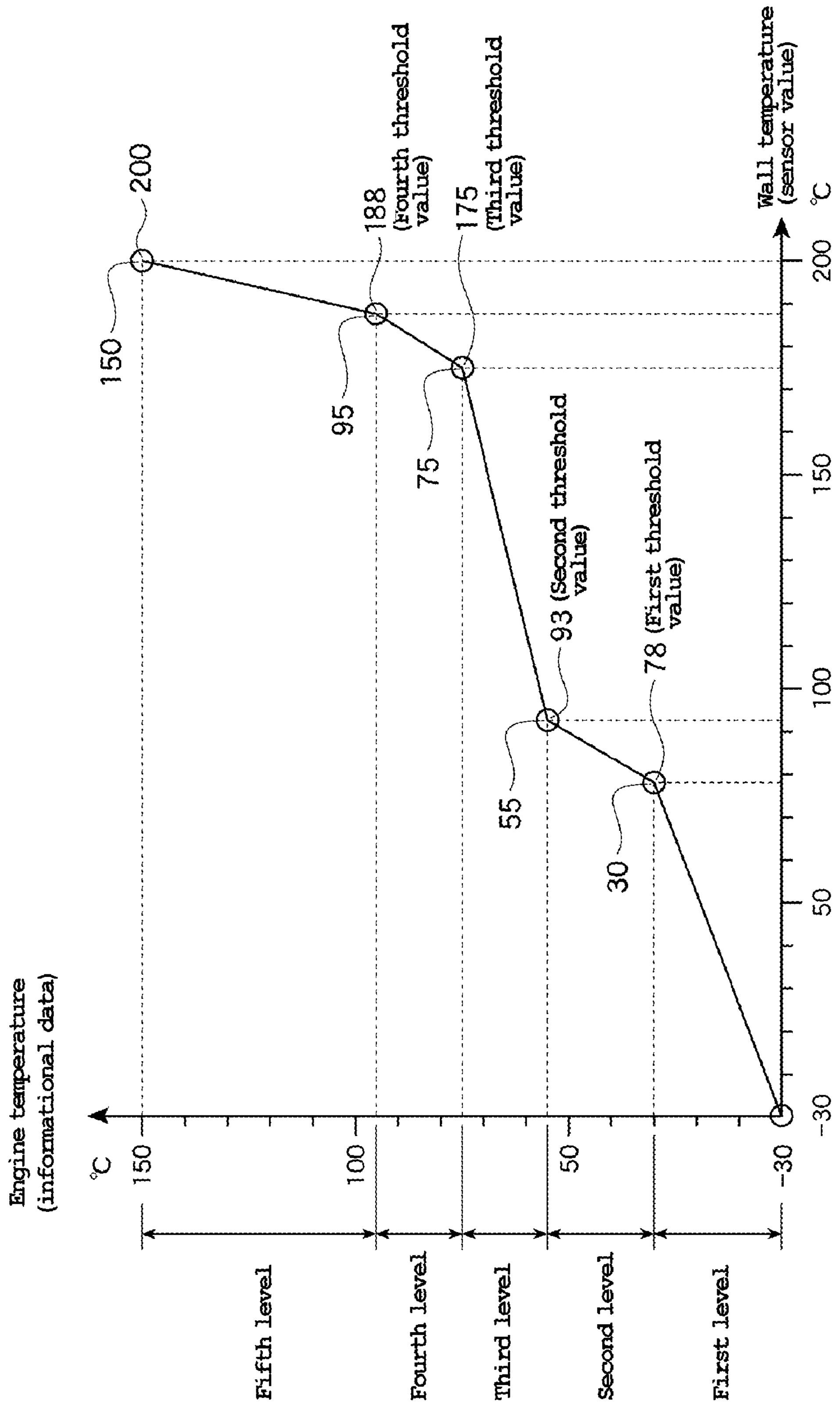
FIG. 5 is a graph indicating the relationship between engine block wall temperature and engine coolant temperature of a nonstandard engine model.

The graph shown in FIG. 5 indicates the relationship between engine block wall temperature and engine temperature of an engine model with a different engine coolant temperature setting (a higher engine block wall temperature than the standard model engine). As shown in the graph, the engine block wall temperatures, −30° C., 78° C., 93° C., 175° C., 188° C., and 200° C., are the temperatures of the inflection points, and correspond to the engine temperatures, −30° C., 30° C., 55° C., 75° C., 95° C., and 150° C., respectively. The engine block wall temperature of 93° C., for example, is the minimum temperature of the engine in a normal state, and the engine block wall temperature of 175° C., for example, is the maximum temperature of the engine in the normal state.

The first through fourth threshold values in steps S13 through S16 in the flowchart shown in FIG. 6 are values specific to the engine C of the outboard motor B shown in FIG. 2, and are stored in the nonvolatile memory 12 of the ECU 10, which is specific to the engine C. The specific first, second, third, and fourth threshold values are 50° C., 59° C., 125° C., and 135° C., for example, of the engine block wall temperatures in FIG. 4 in the case where the engine C is an engine corresponding to model A with low engine block wall temperatures, for example. In the case that the engine C corresponds to engine model B with high engine block wall temperatures shown in FIG. 5, the first, second, third, and fourth threshold values are 78° C., 93° C., 175° C., and 188° C., for example, of the engine block wall temperatures in FIG. 5.

Figure 7:
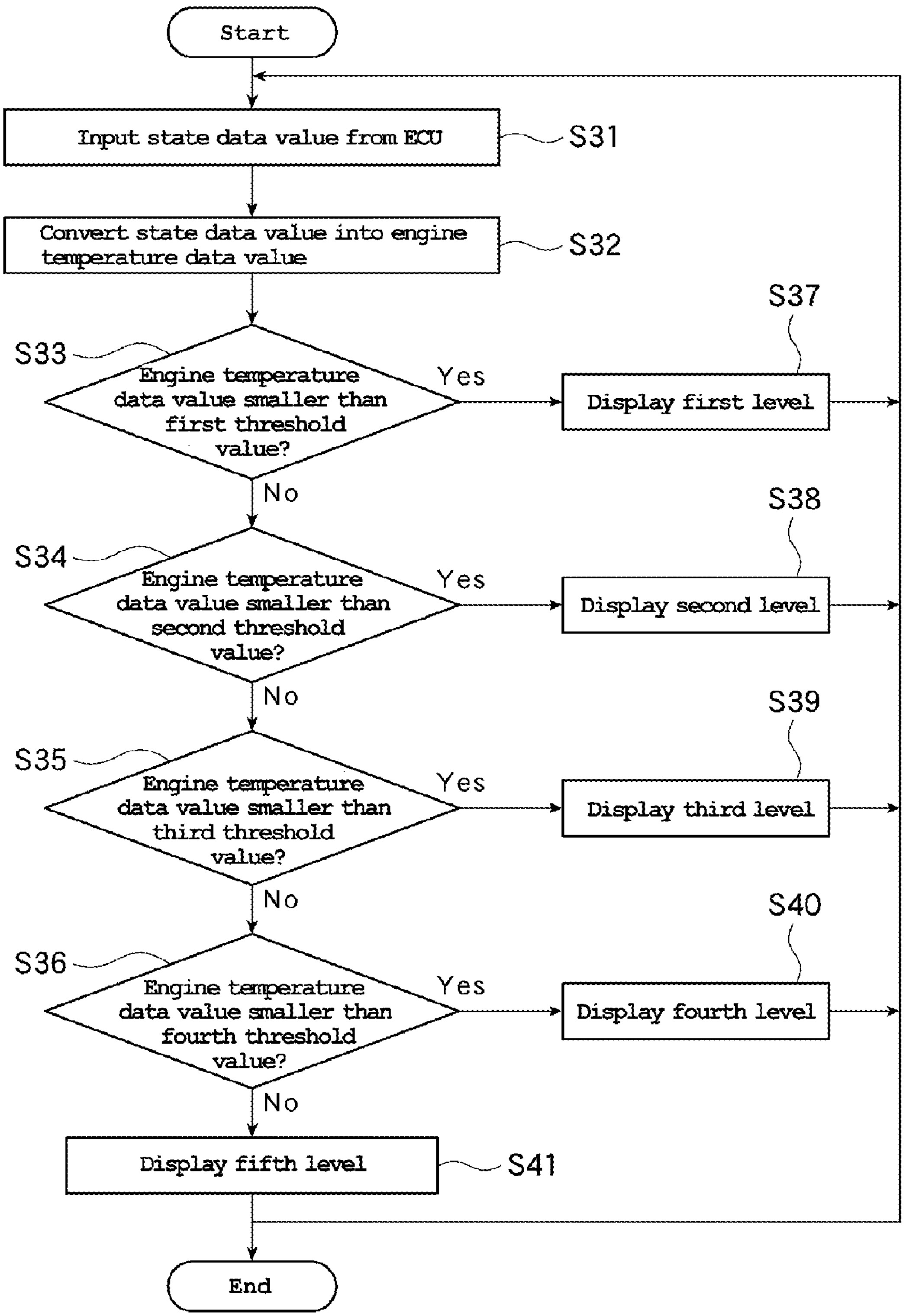
FIG. 7 is a flowchart showing a control process executed by a gauge of the engine state display system for the watercraft propulsion unit in FIG. 1.

The first through fourth threshold values in steps S33 through S36 in the flowchart shown in FIG. 7 are values specific to the gauge 20 installed in the watercraft A shown in FIG. 2, and are stored in the nonvolatile memory 23. The specific first, second, third, and fourth threshold values are limited to the engine temperatures of the engine C of the standard model. The specific first, second, third, and fourth threshold values are 25° C., 45° C., 65° C., and 85° C. of the engine temperature in FIG. 4 since the engine model A with low engine block wall temperatures is the standard in the present preferred embodiment.

Therefore, a control described in the following is made if disagreement in the temperature characteristics occurs between the engine model A having temperature characteristics of FIG. 4 and the engine model B having temperature characteristics of FIG. 5.

With reference to FIGS. 4 through 7, descriptions will be made in detail especially with respect to the feature that an engine temperature at an appropriate level can be displayed on the engine state display device, which has been already installed on the watercraft, even if a user purchases a new outboard motor with high engine temperatures.

In the case that it is determined that the engine block wall temperature is smaller than the first threshold value in step S13 in FIG. 6, the process goes to step S18. Now, description will be made with specific values on the output of the state data value b1 smaller than the first threshold value of a gauge 20 in the step S18. In the case that the ECU 10 detects an appropriate temperature at a first level of the engine block wall temperature (−30° C. through 78° C.) in FIG. 5, for example, an engine block wall temperature of 70° C., the ECU 10 outputs a signal corresponding to an appropriate engine temperature (preferably 10° C.) which is almost in the middle of a range at a first level (−30° C. through 25° C.) of the engine temperature in FIG. 4. That is, if an engine block wall temperature at a first level of an engine of a nonstandard model is input, the ECU 10 converts the temperature into an engine temperature at the first level of the standard engine model and outputs the converted temperature. Thereafter, the process goes to step S37 if it is determined that the engine temperature data value is smaller than the first threshold in step S33 in FIG. 7, and thereby an appropriate engine temperature at the first level can be displayed.

In the case that it is determined that the engine block wall temperature is smaller than the second threshold value in step S14 in FIG. 6, the process goes to step S19. Now, description will be made with specific values on the output of the state data value b2 between the first and second threshold values of the gauge 20 in the step S19. In the case that the ECU 10 detects an appropriate temperature in a temperature range of a second level (78° C. through 93° C.) in FIG. 5, for example, an engine block wall temperature of 90° C., the ECU 10 outputs a signal corresponding to an appropriate engine temperature (preferably 35° C.) which is in the middle of the temperature range of a second level (25° C. through 45° C.) of the engine temperature in FIG. 4 to the gauge 20. That is, if an engine block wall temperature at the second level of the nonstandard engine model is input, the ECU 10 converts the temperature into an appropriate engine temperature in the range of the second level of the standard engine model and outputs the converted temperature. Thereafter, the process goes to step S38 if it is determined that the engine temperature data value is smaller than the second threshold value in step S34 in FIG. 7, and thereby an appropriate engine temperature at the second level can be displayed.

In the case that it is determined that the engine block wall temperature is smaller than the third threshold value in step S15 in FIG. 6, the process goes to step S20. Now, description will be made with specific values on the output of the state data value b3 between the second and third threshold values of the gauge 20 in the step S20. In the case that the ECU 10 detects an appropriate value in a temperature range of a third level (93° C. through 175° C.) in FIG. 5, for example, an engine block wall temperature of 160° C., the ECU 10 outputs a signal corresponding to an appropriate engine temperature (preferably 55° C.) which is in the middle of the range of the third level (45° C. through 65° C.) of the engine temperature in FIG. 4 to the gauge 20. That is, if an engine block wall temperature at the third level of the nonstandard engine model is input, the ECU 10 converts the temperature into an appropriate engine temperature in the range of the third level of the standard engine model and outputs the converted temperature. Thereafter, the process goes to step S39 if it is determined that the engine temperature data value is smaller than the third threshold value in step S35 in FIG. 7, and thereby an appropriate engine temperature at the third level can be displayed.

In the case that it is determined that the engine block wall temperature is smaller than the fourth threshold value in step S16 in FIG. 6, the process goes to step S21. Now, description will be made with specific values on the output of the state data value b4 between the third and fourth threshold values of the gauge 20 in the step S21. In the case that the ECU 10 detects an appropriate value in a temperature range of a fourth level (175° C. through 188° C.) in FIG. 5, for example, an engine block wall temperature of 180° C., the ECU 10 outputs a signal corresponding to an appropriate engine temperature (preferably 75° C.) which is in the middle of the range of the fourth level (65° C. through 85° C.) of the engine temperature in FIG. 4 to the gauge 20. That is, if an engine block wall temperature at the fourth level of the nonstandard engine model is input, the ECU 10 converts the temperature into an appropriate engine temperature in the range of the fourth level of the standard engine model and outputs the converted temperature. Thereafter, the process goes to step S40 if it is determined that the engine temperature data value is smaller than the fourth threshold value instep S36 in FIG. 7, and thereby an appropriate engine temperature at the fourth level can be displayed.

In the case that it is determined that the engine block wall temperature is larger than the fourth threshold value in step S16 in FIG. 6, the process goes to step S22. Now, description will be made with specific values on the output of the state data value b5 larger than the fourth threshold value of the gauge 20 in the step S22. In the case that the ECU 10 detects an appropriate value in a temperature range of a fifth level (188° C. through 200° C.) in FIG. 5, for example, an engine block wall temperature of 200° C., the ECU 10 outputs a signal corresponding to an appropriate engine temperature (preferably 120° C.) which is almost in the middle of the range of the fifth level (85° C. through 150° C.) of the engine temperature in FIG. 4 to the gauge 20. That is, if an engine block wall temperature at the fifth level of the nonstandard engine model is input, the ECU 10 converts the temperature into an appropriate engine temperature in the range of the fifth level of the standard engine model and outputs the converted temperature. Thereafter, the process goes to step S41 if it is determined that the engine temperature data value is larger than the fourth threshold value in step S34 in FIG. 7, and thereby an appropriate engine temperature at the fifth level can be displayed.

As described in the foregoing, the ECU 10 computes the engine block wall temperature data values using the four threshold values about the engine block wall temperature specific to a particular engine model, converts the data values into engine temperature data values in a scale used in the standard model, and outputs the converted data values. Thereby, even if a user purchases a new outboard motor with a different engine coolant temperature setting, for example, an outboard motor with high engine temperatures, an engine temperature at an appropriate level can be displayed on an engine state display device which has been already installed in the watercraft.

In the present preferred embodiment, the temperature sensor (not shown) for detecting a temperature of the engine block wall is used as a detection device arranged to detect an engine temperature. Conventionally, an engine temperature (engine coolant temperature) is directly detected. However, in the present preferred embodiment, direct detection is not made, but detection of the engine block wall temperature for engine control is also used for displaying the engine coolant temperature. Thereby, the addition of a new temperature sensor is not necessary. Accordingly, the cost for the additional sensor can be saved, and space, in which the sensor would be disposed, becomes unnecessary.

With the present preferred embodiment, software programs of the control portion 11 of the engine control unit 10 merely have to be changed. Thereby, the conversion into the state data values for calculating and displaying the engine temperatures of the standard engine model can be made in the engine control unit 10. Consequently, the installation of a new engine state display device for a watercraft propulsion unit for a particular purpose is not required. The engine state display device for a watercraft propulsion device, which has been already installed, can be used for displaying the engine states except for the engine coolant temperatures.

Further, since the engine block wall temperature is detected and input to the ECU 10, the slope of the line section is gradual and a measurement range is wide in the range of the engine block wall temperatures between 59° C. and 125° C., as indicated in FIG. 6. Therefore, there is an advantage that a temperature range of the engine in the normal state can be more stably detected by detection of the engine block wall temperatures than detection of the engine temperatures with a narrow measurement range of the engine coolant temperatures between 45° C. and 65° C.

The present invention is not limited to the above described preferred embodiments, and various modifications are possible.

In the above preferred embodiments, a temperature signal obtained by detecting each state of the engine of the outboard motor is computed by the control portion of the engine control unit, and thereby an engine temperature data value is obtained. The engine temperature data value is sent to the engine state display device on the watercraft by the LAN. However, a system for detection and computation may be provided separately from the control portion of the engine control unit.

In the above preferred embodiments, the detected engine block wall temperature is input to the ECU 10, and converted into the engine temperature of the standard engine model. However, the present invention includes a case in which the engine temperature or the engine coolant temperature is input to the ECU 10, and converted into the engine temperature of the standard engine model similarly to the conventional case.

Additionally, the conventional device disclosed in JP-A-2005-164743 can be applied to the gauge 20.

The preferred embodiments of the present invention may be applied to not only outboard motors, but also inboard/outboard motors.

The preferred embodiments include a case that the LAN between the ECU 10 and the gauge 20 is provided with duplex transmission cables. In this case, an operator of the watercraft A can control the ECU 10 by operating the gauge 20. Also, the operator can operate the ECU 10 of the outboard motor B by operating a main remote control ECU of the watercraft A. It is preferable to display a warning on the gauge 20 when one of the duplex transmission cables is incapable of or having trouble with communication. Further, when both of the duplex transmission cables are incapable of or having trouble with communication, the engine should not be stopped since passengers may experience instability. Instead, it is preferable to arrange the concerned devices in a manner such that the ECU 10 of the outboard motor B can determine that both of the cables have trouble, is automatically switched to a failure mode, and gradually closes the throttle valves to the fully closed state. Namely, it is preferable to safely lower an engine speed without providing a sudden reaction on the hull.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An outboard motor comprising:

an engine control unit including a memory device and a control portion; wherein the memory device is arranged to store a plurality of threshold values for an engine temperature of a standard engine;

the control portion is arranged and programmed to receive a detection signal corresponding to a temperature of a non-standard engine that runs at a normal temperature that is a higher temperature or a lower temperature compared to a normal temperature of the standard engine, to determine an engine temperature level based on the plurality of threshold values and the detection signal, to convert the detection signal into an appropriate engine temperature data value based on the engine temperature level, and to send the appropriate engine temperature data value from the outboard motor to a display device on a watercraft;

when the normal temperature of the non-standard engine runs higher than the normal temperature of the standard engine, the control portion is programmed to convert the detection signal into the appropriate engine temperature data value by decreasing the temperature corresponding to the detection signal; and when the normal temperature of the non-standard engine runs lower than the normal temperature of the standard engine, the control portion is programmed to convert the detection signal into the appropriate engine temperature data value by increasing the temperature corresponding to the detection signal.

2. A watercraft comprising:

the outboard motor according to claim 1.

3. The watercraft according to claim 2, wherein the temperature corresponds to an engine block wall temperature or an engine coolant temperature.

4. The watercraft according to claim 2, further comprising a display device including a transmission module and a display portion, wherein the transmission module is arranged to receive the appropriate engine temperature data value from the control portion of the outboard motor.

5. The watercraft according to claim 4, wherein the display device includes a display device control portion and a display device memory device, and the display device control portion is arranged to determine display data based on a plurality of second threshold values stored in the display device memory device, and to output the display data to the display portion.

* * * * *